(12) United States Patent
Djermester et al.

(10) Patent No.: US 12,083,981 B2
(45) Date of Patent: Sep. 10, 2024

(54) IMPACT CUSHION DEVICE FOR A MOTOR VEHICLE

(71) Applicant: Bayerische Motoren Werke Aktiengesellschaft, Munich (DE)

(72) Inventors: Roman Djermester, Riedering (DE); Christopher Stahl, Markt Schwaben (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 18/035,312

(22) PCT Filed: Nov. 9, 2021

(86) PCT No.: PCT/EP2021/081016
§ 371 (c)(1),
(2) Date: May 4, 2023

(87) PCT Pub. No.: WO2022/101157
PCT Pub. Date: May 19, 2022

(65) Prior Publication Data
US 2023/0406253 A1    Dec. 21, 2023

(30) Foreign Application Priority Data
Nov. 12, 2020  (DE) ..................... 10 2020 129 843.9

(51) Int. Cl.
*B60R 21/207* (2006.01)
*B60R 21/2165* (2011.01)

(52) U.S. Cl.
CPC ........ *B60R 21/207* (2013.01); *B60R 21/2165* (2013.01)

(58) Field of Classification Search
CPC .......................... B60R 21/207; B60R 21/2165
See application file for complete search history.

(56) References Cited

U.S. PATENT DOCUMENTS 5,799,970 A * 9/1998 Enders ................ B60R 21/2171
                                                        280/730.2
6,422,590 B1 * 7/2002 Umezawa ............. B60R 21/207
                                                        280/730.2
(Continued)

FOREIGN PATENT DOCUMENTS

EP           1 447 284 A1      8/2004

OTHER PUBLICATIONS

International Search Report (PCT/ISA/210) issued in PCT Application No. PCT/EP2021/081016 dated Jan. 20, 2022 with English translation (four (4) pages).
(Continued)

*Primary Examiner* — Faye M Fleming
(74) *Attorney, Agent, or Firm* — Crowell & Moring LLP

(57) ABSTRACT

An impact cushion device for a motor vehicle includes an impact cushion, which can be adjusted from a compressed stowed position into an expanded use position. A motor vehicle component and a cover element together delimit a receiving area for the impact cushion when the impact cushion is in the stowed position. The cover element is held on the motor vehicle component via a latching connection at least in some regions when the impact cushion is arranged in the stowed position, and the cover element can be released from the motor vehicle component at least in some regions when the impact cushion is adjusted from the stowed position into the use position. The receiving area is equipped with a plastic foam which covers at least some regions of the impact cushion relative to the cover element when the impact cushion is in the stowed position, the plastic foam being covered by the cover element.

10 Claims, 3 Drawing Sheets

(56) References Cited

U.S. PATENT DOCUMENTS

| | | | | |
|---|---|---|---|---|
| 7,290,793 | B2* | 11/2007 | Tracht | B60R 21/207 |
| | | | | 280/730.2 |
| 7,322,597 | B2* | 1/2008 | Tracht | B60R 21/207 |
| | | | | 280/730.2 |
| 7,942,439 | B2 | 5/2011 | Miura | |
| 8,820,780 | B2* | 9/2014 | Thomas | B60R 21/207 |
| | | | | 280/730.2 |
| 9,630,584 | B2* | 4/2017 | Fujiwara | B60R 21/207 |
| 11,214,221 | B2* | 1/2022 | Moon | B60R 21/23138 |
| 2006/0113767 | A1 | 6/2006 | Tracht | |

OTHER PUBLICATIONS

German-language Written Opinion (PCT/ISA/237) issued in PCT Application No. PCT/EP2021/081016 dated Jan. 20, 2022 (five (5) pages).

* cited by examiner

IMPACT CUSHION DEVICE FOR A MOTOR VEHICLE

BACKGROUND AND SUMMARY

The invention relates to an impact cushion device for a motor vehicle.

U.S. Pat. No. 7,942,439 B2 discloses a fastening device for a motor vehicle, by means of which an impact cushion is able to be received. The impact cushion by means of the fastening device is able to be fastened in a roof region of the automobile. The fastening device comprises a roof element by means of which the impact cushion in the stowage position thereof is obscured and which is able to swing open so as to enable the impact cushion to expand. A latching element which is able to be latched into a latching receptacle of a motor vehicle component is disposed on the roof element. When the impact cushion is obscured by means of the roof element, the latching element of the roof element is snapped into the latching receptacle of the motor vehicle component. In order for the roof element to swing open relative to the motor vehicle component, the latching element is released from the latching receptacle. The fastening device can furthermore comprise a textile fabric which is set under tension when the impact cushion expands, wherein the latching element is moved out of the latching receptacle by means of the textile as a consequence of the tension.

It is an object of the present invention to provide an impact cushion device for a motor vehicle, which enables the impact cushion to be particularly safely stowed in the stowage position of the latter, and the impact cushion device to be integrated in a vehicle seat of the motor vehicle.

This object is achieved according to the invention by an impact cushion device for a motor vehicle, having the features of the independent patent claim. Advantageous embodiments of the invention are the subject matter of the dependent patent claims and of the description.

The invention relates to an impact cushion device for a motor vehicle, having an impact cushion which is adjustable from a compressed stowage position to an expanded use position. For example, the impact cushion can be expanded from the stowage position to the use position in the event of an accident being detected. In the use position, a movement of a vehicle occupant can be absorbed by means of the impact cushion in the use position, so as to protect the vehicle occupant from injury. The impact cushion device furthermore comprises a motor vehicle component and a cover trim element which conjointly delimit a receptacle for the impact cushion in the stowage position thereof. This means that the motor vehicle component and the trim element conjointly enclose the impact cushion in the stowage position thereof. The trim element, when disposing the impact cushion in the stowage position, is at least in regions held on the motor vehicle component by way of a latching connection. The trim element, when adjusting the impact cushion from the stowage position thereof to the use position, is at least in regions releasable from the motor vehicle component. In particular, the trim element, when adjusting the impact cushion from the stowage position thereof to the use position, is specified to swing open so as to enable the impact cushion to unfold in an interior space of the motor vehicle, the latter being in particular an automobile.

In order to enable the impact cushion device to be integrated in a vehicle seat of the motor vehicle, it is provided according to the invention that a plastic foam by means of which the impact cushion in the stowage position thereof is at least in regions obscured toward the trim element and which is covered by the trim element is disposed on the receptacle. In this way, the impact cushion in the stowage position thereof is obscured toward the outside, in particular toward the interior space of the motor vehicle, by the plastic foam and by the trim element. The plastic foam can in particular be a polyurethane foam which is elastic. This polyurethane foam is obscured toward the interior space of the motor vehicle by a textile fabric as the trim element, for example. The textile fabric here bears in particular on the plastic foam. Alternatively, the trim element may be a leather or an artificial leather, for example. In this way, the impact cushion device has an upholstery region which is provided by the plastic foam and the trim element and which enables the impact cushion device to be particularly advantageously integrated in a vehicle seat, for example in a vehicle backrest or in a seat side frame of the vehicle seat.

In a further design embodiment of the invention, it is provided that the impact cushion device comprises a separation element by means of which a sub-region of the receptacle in which the plastic foam is disposed, conjointly with the trim element and/or the motor vehicle component, is completely enclosed in each position of the impact cushion. The separation element can be a textile fabric by means of which the plastic foam, conjointly with the trim element and/or the motor vehicle component, is completely enclosed independently of a position of the impact cushion. It can be ensured as a result that the plastic foam is retained during an expansion of the impact cushion, as a result of which it can be avoided that the plastic foam shoots into the interior space of the motor vehicle during the expansion of the impact cushion. Instead, the plastic foam by means of the separation element is securely held on the trim element and/or the motor vehicle component in each position of the impact cushion.

In a further design embodiment of the invention, it is provided that the separation element encloses the impact cushion in the stowage position thereof at least in regions. For this purpose, the separation element at least in regions can bear on the impact cushion. The sub-region is cleanly separated from the impact cushion by means of the separation element, as a result of which the impact cushion is disposed outside the sub-region. Direct contact between the impact cushion and the plastic foam is precluded in this way. As a result of the impact cushion being enclosed at least in regions by means of the separation element and of the latter bearing on the impact cushion at least in regions, the sub-region occupies a particularly large proportion of the receptacle, as a result of which this proportion is able to be filled by the plastic foam. As a result, a region in the receptacle which is kept free of all elements can be kept particularly small, as a result of which the impact cushion device is configured so as to be particularly compact. In particular, the plastic foam is disposed particularly close to the impact cushion and occupies a particularly large part of the volume of the receptacle, so as to particularly strongly safeguard the impact cushion in relation to damage and, by virtue of the particularly heavy upholstering, to provide a particularly high level of comfort for a vehicle occupant.

In a further design embodiment of the invention, it is provided that the separation element at one end is held on the trim element and at the other end on the motor vehicle component. When the trim element is pivoted relative to the motor vehicle component during the adjustment of the impact cushion from the stowage position thereof to the expanded use position, the separation element thus changes its shape, is in particular impinged with tension. As a consequence of the separation element being impinged with the tension, a pivoting movement of the trim element can be delimited by the latter being attached to the separation element. The delimitation of the pivoting movement of the trim element makes it possible that the risk of damage to the trim element during the pivoting of the latter as a result of the expansion of the impact cushion can be kept particularly minor. Moreover, the fastening of the separation element to the trim element at one end and to the motor vehicle component at the other end makes it possible that a particularly large proportion of the receptacle is separated as the sub-region.

In a further design embodiment of the invention, it is provided that the separation element at one end is stitched to the trim element. The separation element is able to be fastened to the trim element at one end in a particularly simple and secure manner by way of the stitching. In particular, the separation element can be stitched to the trim element in a particularly simple manner when the separation element as well as the trim element are in each case formed from a textile fabric. The separation element here at one end is stitched to the trim element so as to particularly advantageously demarcate the sub-region by means of the separation element and the trim element and optionally additionally by means of the motor vehicle component.

In a further design embodiment of the invention, it has proven advantageous for the trim element to have a first latching element which for providing the latching connection is able to be brought to engage with a second latching element of the motor vehicle component. In order for the trim element at one end to be released from the motor vehicle component, either the latching connection can be released or the trim element can be subdivided, as a result of which at least one sub-region of the trim element is at least in regions releasable from the motor vehicle component, as a result of which the sub-region of the trim element is pivotable upward relative to the motor vehicle component in order to enable the expansion of the impact cushion. By bringing the first latching element to engage with the second latching element, for example in that the latching elements engage behind one another or interlock, the trim element can be particularly securely held on the motor vehicle component when the impact cushion is disposed in the stowage position.

It has proven particularly advantageous here for the separation element to obscure the first latching element toward the second latching element. This means that the separation element in the region of a force acting between the first latching element and the second latching element bears on the first latching element and/or the second latching element, in particular is disposed between the first latching element and the second latching element, as a result of which direct contact between the first latching element and the second latching element can be precluded. When the impact cushion expands from the stowage position to the use position, the separation element is impinged with tension, as a result of which the separation element can be changed in terms of the shape thereof. As a consequence of the shape of the separation element being changed, the separation element releases the first latching element from the second latching element, as a result of which the latching connection is released. As a consequence of the latching connection being released, the trim element can pivot upward relative to the motor vehicle component, as a result of which the impact cushion in turn can expand into the interior space of the motor vehicle. The unlatching of the first latching element from the second latching element can thus be facilitated by means of the separation element. In the stowage position of the impact cushion, the latching connection can thus make possible that the trim element is particularly securely fastened to the motor vehicle, wherein the releasing of the latching connection is facilitated by means of the separation element during the expansion of the impact cushion.

In a further design embodiment of the invention, it is provided that the trim element has a predetermined breaking point at which the first latching element is able to be separated from a remainder of the trim element when the impact cushion is adjusted from the stowage position to the use position. As a consequence of a force acting on the trim element during the expansion of the impact cushion from the stowage position to the use position, the first latching element is thus separated from the remainder of the trim element at the predetermined breaking point, as a result of which the remainder of the trim element can pivot upward relative to the motor vehicle component so as to enable the expansion of the impact cushion into the use position. In this way, the latching element is torn off from the remainder of the trim element at the predetermined breaking point when the impact cushion during the expansion presses against the trim element, as a result of which the first latching element is torn off from the remainder of the trim element as a consequence of tension resulting at the predetermined breaking point in the trim element. The release of the latching connection in the process is irrelevant, because the remainder of the trim element can be pivoted relative to the motor vehicle component so as to enable the expansion of the impact cushion from the stowage position to the use position.

It has proven particularly advantageous here for the trim element at the predetermined breaking point to have a perforation. The perforation causes a weakening of the material of the trim element at the predetermined breaking point, as a result of which the trim element breaks under tension at the predetermined breaking point. The perforation can be incorporated into the trim element in a particularly simple manner. Moreover, the predetermined breaking point in terms of the position thereof can be particularly precisely predefined by way of the perforation.

In an alternative or additional design embodiment of the invention, it has proven advantageous for the trim element at the predetermined breaking point to have a tear seam. This is understood to mean that the trim element at the predetermined breaking point has two sub-regions which are configured separately from one another and are connected by way of a seam, wherein the seam predefines the predetermined breaking point. The seam is torn open as a consequence of the trim element being stressed, for example owing to the expansion of the impact cushion to the use position, as a result of which the sub-regions of the trim element are separated from one another. The separation of the sub-regions of the trim element from one another makes it possible that at least one of the sub-regions can be pivoted relative to the motor vehicle component so as to enable the expansion of the impact cushion into the interior space of the motor vehicle. A trigger force for the tearing of the tear seam can be predefined by way of a respective stitch width and a yarn thickness of a yarn that provides the tear seam.

Further features of the invention are derived from the claims, the figures and the description of the figures. The features and combinations of features mentioned above in the description and the features and combinations of features mentioned in the description of the figures below and/or shown solely in the figures can be used not only in the respectively stated combination but also in other combinations or on their own.

The invention will now be explained in more detail by means of a preferred exemplary embodiment and with reference to the drawings.

Functionally equivalent elements are assigned the same reference signs in the figures.

DETAILED DESCRIPTION OF THE DRAWINGS

Figure 1:
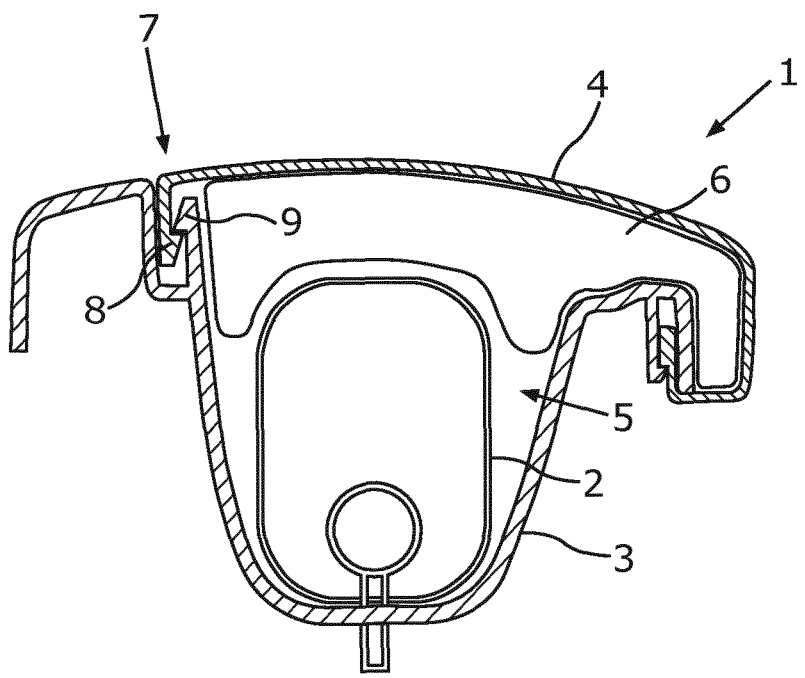
FIG. 1 is a schematic sectional view of an impact cushion device in a first embodiment, having an impact cushion which is disposed in the stowage position thereof in a receptacle enclosed by a trim element and by a motor vehicle component, wherein the impact cushion toward the trim element is obscured by a plastic foam, and the trim element is held on the motor vehicle component by way of a latching connection.

An impact cushion device 1 for a motor vehicle is shown in FIG. 1. The motor vehicle is in particular an automobile, in particular a passenger automobile. The impact cushion device 1 comprises an impact cushion 2 which can be referred to as an airbag. The impact cushion 2 in FIG. 1 is shown in the stowage position thereof. In order to protect a vehicle occupant of the automobile from injury, in particular in the event of an accident, the impact cushion 2 is adjustable from a compressed stowage position to an expanded use position. An ignition tablet device by means of which the impact cushion 2 is particularly rapidly expandable can be provided for adjusting the impact cushion 2 from the stowage position to the use position. In order for a particularly advantageous stowage of the impact cushion 2 in the stowage position thereof to be enabled, it is provided that the impact cushion device 1 has a motor vehicle component 3 and a trim element 4 by means of which a receptacle 5 in which the impact cushion 2 in the stowage position thereof can be received is able to be delimited. Presently, the motor vehicle component 3 provides a hollow in which the impact cushion 2 in the stowage position thereof can be placed. The receptacle 5 in an installed position of the impact cushion device 1 is delimited toward an interior space of the automobile by means of the trim element 4. In this way, the trim element 4 obscures the impact cushion 2 in the stowage position thereof in the installed position toward the interior space of the automobile.

In addition to the impact cushion 2, a plastic foam 6 is presently disposed in the receptacle 5. This plastic foam 6 obscures the impact cushion 2 toward the trim element 4. This means that the trim element 4 obscures the plastic foam 6 toward the interior space of the automobile. The plastic foam 6 here is covered with the trim element 4. For this purpose, the trim element 4 bears on the plastic foam 6. The trim element 4 can in particular be a textile fabric by means of which the plastic foam 6 is concealed toward the interior space of the automobile. The plastic foam 6 serves in particular for shaping the impact cushion device 1 and is covered with the trim element 4 which is in particular configured so as to be limp. The trim element 4 can be formed from a flexible cloth cover and/or from a flexible leather and/or from a flexible plastics material. The plastic foam 6, conjointly with the trim element 4, provides an upholstery of the impact cushion device 1. The upholstering of the impact cushion device 1 makes it possible for the impact cushion device 1 to be able to be integrated in a vehicle seat of the automobile, in particular in an upholstery of the vehicle seat. The upholstering of the impact cushion device 1 enables the impact cushion device 1 to be particularly advantageously incorporated in a side frame of the seat and/or in a seat backrest of the vehicle seat of the motor vehicle, because the impact cushion device 1 in terms of the haptics fits into a surrounding region of the vehicle seat that surrounds the impact cushion device 1, and a transition between the impact cushion device 1 and the vehicle seat is particularly hard to perceive by a vehicle occupant.

The trim element 4 in regions is presently held on the motor vehicle component 3 by way of a latching connection 7. The latching connection 7 presently is disposed in a concavity of the motor vehicle component 3. As a result, the latching connection 7 is concealed toward the interior space of the automobile, as a result of which the latching connection 7 is not visible from the interior space of the automobile. For providing the latching connection 7, the trim element 4 has a first latching element 8 which is able to be brought to engage with a second latching element 9 of the motor vehicle component 3. The first latching element 8 can in particular be a welt strip, of which the piping can be undone for releasing the latching connection 7 from the second latching element 9. When the first latching element 8 is engaged with the second latching element 9, the latching connection 7 existing as a result, the trim element 4 is particularly securely held on the motor vehicle component 3. In this way, the impact cushion 2 in the stowage position thereof is particularly securely received in the receptacle 5 of the impact cushion device 1 when the latching connection 7 exists. In order to enable the impact cushion 2 to be adjusted from the stowage position thereof to an expanded use position in which the impact cushion 2 reaches into the interior space of the automobile in order to protect a vehicle occupant from damage, it is provided that the trim element 4 at least in regions is pivotable relative to the motor vehicle component 3 so as to expose an opening of the receptacle 5 by way of which the impact cushion 2 can be expanded into the interior space of the automobile.

Figure 2:
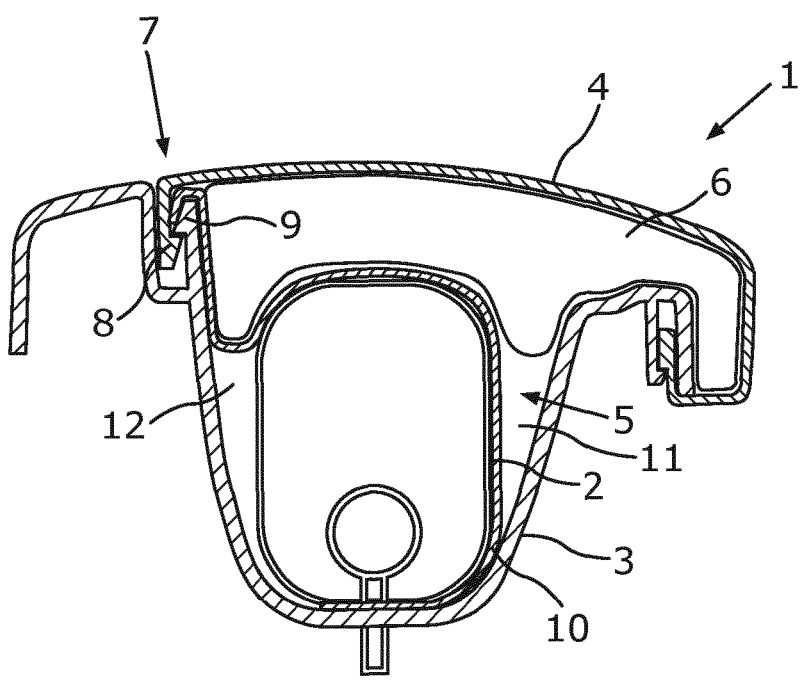
FIG. 2 is a schematic sectional view of the impact cushion device in a second embodiment, in which a separation element is connected to the trim element at one end, by which a sub-region is demarcated in the receptacle, in which sub-region the plastic foam is disposed, as a result of which the plastic foam is separated from the impact cushion by the separation element.

The impact cushion device 1 is shown in a further embodiment in FIG. 2, in which the impact cushion device 1 has a separation element 10. The separation element 10 can be formed from a woven polyamide fabric which has a particularly low elongation. The separation element 10 at one end is connected to the trim element 4, presently stitched to the latter. By means of the separation element 10 a first sub-region 11 is able to be separated from a second sub-region 12 within the receptacle 5. The plastic foam 6 is disposed in the first sub-region 11. The impact cushion 2 is disposed in the second sub-region 12. In each position of the trim element 4 relative to the motor vehicle component 3, and thus independently of whether the impact cushion 2 is disposed in the stowage position or in the use position, the second sub-region 12 is completely enclosed by means of the separation element 10, the trim element 4 and by means of the motor vehicle component 3. In this way, the plastic foam 6 is securely disposed in the first sub-region 11, and as a result held on the trim element 4 and the motor vehicle component 3, independently of a position of the impact cushion 2. It can thus be substantially avoided that the plastic foam 6 shoots into the interior space of the automobile when the impact cushion 2 is adjusted from the stowage position thereof to the use position thereof. In this way, the plastic foam 6 is secured in the first sub-region 11 by means of the separation element 10. The plastic foam 6 as well as the impact cushion 2 can be protected from damage by means of the separation element 10 in that direct contact between the impact cushion 2 and the plastic foam 6 can be precluded. It can in particular be precluded that the plastic foam 6 is wrapped off by the impact cushion 2 by means of the separation element 10. In this way, the separation element 10 provides a rubbing barrier for the plastic foam 6, as a result of which crumbling of the plastic foam 6 as a consequence of contact with the impact cushion 2 can be at least substantially precluded.

Figure 3:
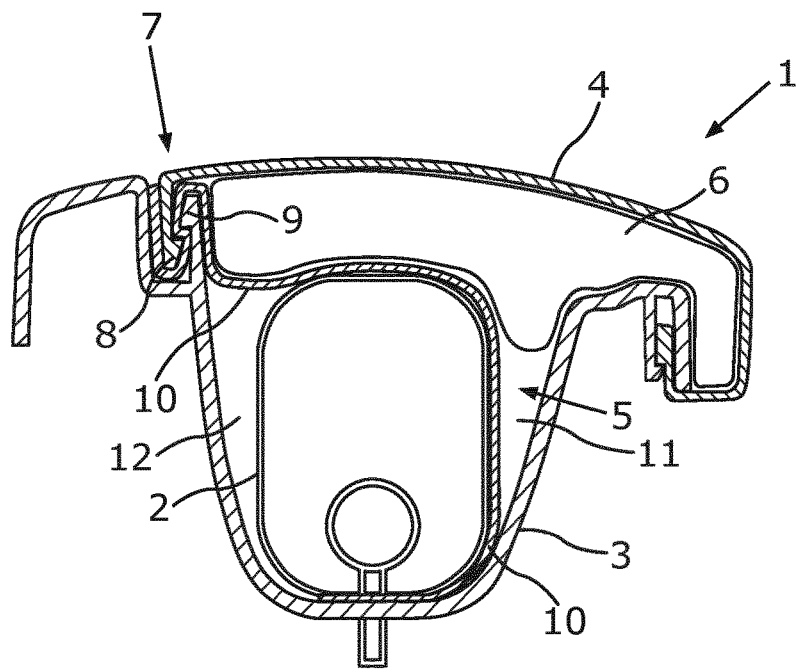
FIG. 3 is a schematic sectional view of the impact cushion device having the separation element, by means of which a first latching element of the trim element in an engaging position is obscured toward a second latching element of the motor vehicle component, in which engaging position there exists the latching connection between the first latching element and the second latching element, as a result of which the latching connection is releasable by means of the separation element.

As can be seen in FIG. 3, the separation element 10 can obscure the first latching element 8 toward the second latching element 9 and herein be held on the trim element 4, in particular be stitched to the trim element 4. When the impact cushion 2 is adjusted from the stowage position to the use position, the separation element 10 is impinged with tension, as a result of which the separation element 10 releases the engagement between the first latching element 8 and the second latching element 9. In this way, the latching connection 7 is released by way of the separation element 10 when the impact cushion 2 is adjusted from the stowage position to the use position, as a result of which the trim element 4 can pivot upward relative to the motor vehicle component 3. The receptacle 5 is opened as a consequence of the trim element 4 being pivoted upward relative to the motor vehicle component 3, as a result of which the impact cushion 2 can expand into the interior space of the automobile by way of the resultant opening of the receptacle 5. When the impact cushion 2 is adjusted from the stowage position to the use position, the separation element 10 is impinged with the tension in that the impact cushion 2, as a consequence of the expansion of the impact cushion 2, presses onto the separation element 10 in the receptacle 5.

As can be seen in particular in FIGS. 2 and 3, the separation element 10 at least in regions is on the impact cushion 2. As a result of the separation element 10 at least in regions bearing on the impact cushion 2, the first sub-region 11 can be kept particularly large in comparison to the second sub-region 12. As a result, a particularly large proportion of the receptacle 5 can be filled with the plastic foam 6. As a result, the impact cushion device 1 can be configured so as to be particularly compact because a particularly small volume of the receptacle 5 is empty or not utilized.

Figure 4A:
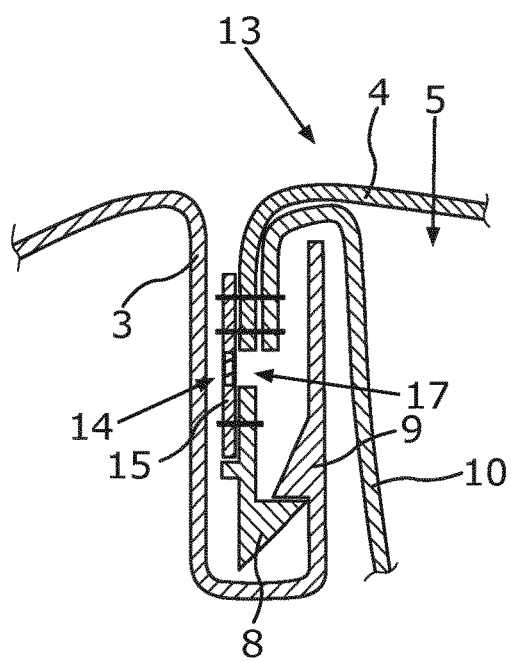
FIGS. 4a and 4b are respective schematic sectional illustrations of the latching connection, wherein the trim element has a predetermined breaking point at which the first latching element is separated from the remainder of the trim element during the expansion of the impact cushion to the use position, so as to enable the remainder of the trim element to pivot relative to the motor vehicle component, as a result of which an opening of the receptacle, by way of which the impact cushion can expand into the use position, is exposed.
Figure 4B:
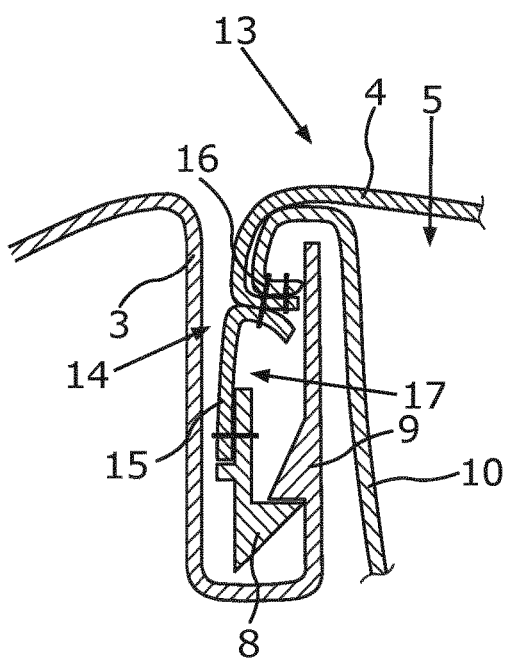

In order to enable pivoting of at least one sub-region of the trim element 4 relative to the motor vehicle component 3 when adjusting the impact cushion 2 from the stowage position to the use position, alternatively or additionally to releasing the latching connection 7, the first latching element 8 can be separated from a remainder 13 of the trim element 4 so as to enable pivoting of the remainder 13 of the trim element 4 relative to the motor vehicle component 3, as a result of which the opening of the receptacle 5 is enabled. In order to enable the first latching element 8 to be separated from the remainder 13 of the trim element 4 in a particularly simple manner, the trim element 4 can have a respective predetermined breaking point 14 at which the first latching element 8 is torn off from the remainder 13 of the trim element 4 when the trim element 4 is stressed, as can be seen in FIGS. 4a and 4b. A region of the trim element 4 that comprises the predetermined breaking point 14 is presently disposed in a concavity of the motor vehicle component 3. As a result, the predetermined breaking point 14 is concealed toward the interior space of the automobile, as a result of which the predetermined breaking point 14 is not visible from the interior space of the automobile.

The predetermined breaking point 14 can be provided by a perforation 17 of the trim element 4. The trim element 4 here can be integrally designed. The trim element 4 in FIGS. 4a and 4b is in each case embodied in multiple parts. In the design embodiment of the trim element 4 shown in FIG. 4a, the first latching element 8 is held on the remainder 13 of the trim element 4 by way of a connection element 15. The connection element 15 is connected to the first latching element 8 as well as to the remainder 13 of the trim element 4. The connection element 15 has the perforation 17 for providing the predetermined breaking point 14. When the trim element 4 is under stress that exceeds a predefined critical load, the connection element 15 is subdivided at the predetermined breaking point 14 and thus in the region of the perforation 17, as a result of which the latching element 8 is separated from the remainder 13 of the trim element 4.

In the design embodiment shown in FIG. 4b, the connection element 15 at one end is connected to the first latching element 8 and at the other end connected to the remainder 13 of the trim element 4 by way of a tear seam 16. When the trim element 4 is under stress that exceeds the predefined critical load, the tear seam 16 is severed as a consequence of the stress, as a result of which the connection element 15 is released from the remainder 13 of the trim element 4. As a consequence of the connection element 15 being released from the remainder 13 of the trim element 4, the first latching element 8 is released from the remainder 13 of the trim element 4. As a result of the first latching element 8 being released from the remainder 13 of the trim element 4, the remainder 13 of the trim element 4 is pivotable upward, as a result of which the opening of the receptacle 5 is exposed and the impact cushion 2 can be expanded into the use position. The tear seam 16 can be torn open in a particularly rapid and simple manner by means of the separation element 10.

The impact cushion device 1 described is based on the concept that impact cushions 2 are used for protecting vehicle occupants in order to meet regulatory requirements or safety requirements. The impact cushion 2, by means of the impact cushion device 1, can provide a side airbag, in particular in a second seat row of a passenger automobile. The impact cushion device 1 is disposed in a side frame of the seat when providing the side airbag. In order for the impact cushion 2 to be separated from the visible interior space of the automobile, the impact cushion 2 is obscured toward the interior space by the plastic foam 6, which can also be referred to as a seat foam, and the trim element 4, which can also be referred to as a seat cover. When the impact cushion 2 is triggered, the latter is to emerge into the interior of the automobile. By igniting the impact cushion 2, a defined opening duct, by way of which the impact cushion 2 at least in regions can emerge from the receptacle 5 into the interior space and unfold to the use position in the interior space, is generated by an interaction of pressure, the woven airbag fabric of the impact cushion 2, the plastic foam 6 and the trim element 4. As an alternative to the disposal of the impact cushion device 1 in the vehicle seat, the impact cushion device 1 can be integrated in a dashboard of the automobile. Furthermore alternatively, the impact cushion device 1 can be integrated in a headliner or in a central console or in a door trim or in a further interior component of the automobile. The latching connection 7 between the trim element 4 and the motor vehicle component 3 is designed such that the latching connection 7 opens at a defined, prespecified force exerted by means of the impact cushion 2, thus providing the opening duct for the impact cushion 2 to emerge into the interior space. As an alternative to opening the latching connection 7 for providing the opening duct, the predetermined breaking point 14 can be provided on the trim element 4, wherein the predetermined breaking point 14 is provided in the recess of the motor vehicle component 3, said recess potentially being a snap-fit duct in which the latching connection 7 is disposed. The disposal of the predetermined breaking point 14 in the recess makes it possible that separate flaps and visible seams, and seams visible from the interior space of the automobile, can be avoided.

Overall, the invention demonstrates how a vehicle seat having an airbag-adaptive cover fastening can be provided.

Figure 5:
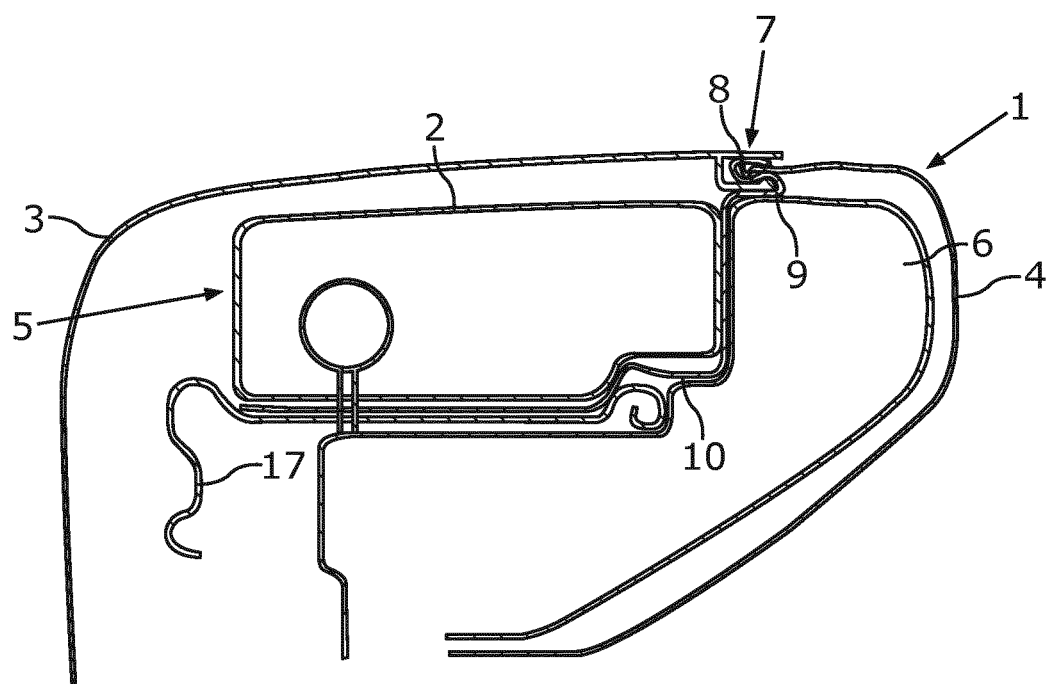
FIG. 5 is a schematic sectional view of the impact cushion device in a third embodiment, in which the impact cushion device is integrated in a vehicle seat configured as a single seat.

FIG. 5 in a schematic sectional view shows the impact cushion device 1 according to a third embodiment. While the impact cushion device 1 according to FIGS. 1 to 4b is disposed, for example, in a vehicle seat which is configured as a seat bench and is disposed in a rear area of the motor vehicle, for example, the impact device 1 according to FIG. 5 is preferably provided for a single seat such as, for example, a front seat, in particular installed in the single seat or integrated in the single seat. Yet again in other words, the impact cushion device 1 according to the third embodiment is, for example, a component part of a single seat, in particular of a front seat. Provided as a further motor vehicle component is a structural component 17 of a seat structure, which presently is a seat backrest structure of a seat backrest of the single seat, also referred to as a backrest. The plastic foam 6 and/or the impact cushion 2 are/is held or supported by the seat structure.

The motor vehicle component 3 in the third embodiment is a further trim element, also referred to as a rear panel or rear wall, which is preferably inherently stiff and formed from a plastics material, for example. The structural component 17 and the impact cushion 2, in particular in the stowage position of the latter, as a result of the motor vehicle component 3 are in each case at least partially, in particular at least largely or completely, obscured and as a result clad, toward the rear in the vehicle longitudinal direction and preferably also toward the outside in the vehicle transverse direction. Moreover provided also in the third embodiment is the separation element, which is also referred to as a bag or inner bag, and which is preferably flexible, i.e. limp.

The trim element 4 in the third embodiment is a flexible, i.e. an inherently limp, seat cover, in particular of the backrest, wherein the plastic foam 6, also referred to as an upholstery foam and forming a seat upholstery, is covered with the seat cover and as a result obscured by the latter.

It can be seen from FIG. 5 that the rear wall (the rear panel or motor vehicle component 3), which is configured or functions as a rear wall trim, widely encompasses the impact cushion 2. Conventionally, it is possible that the rear wall is deformed under the effect of temperature as the service life increases such that gaps can potentially be formed. In order to now avoid any excessive formation of gaps and to be able to integrate the impact cushion device 1 in a particularly advantageous manner in the vehicle seat and to guarantee an advantageous adjustment of the impact cushion 2 from the stowage position to the use position, the rear wall (the rear panel) is held in position by the seat cover (trim element 4) by way of the latching connection 7, also referred to as a snap-fit. As a result, an excessive formation of gaps can be avoided, wherein advantageous unfolding of the impact cushion 2 (airbag), i.e. an advantageous adjustment of the impact cushion 2 from the stowage position to the use position, is however permitted by releasing the latching connection 7, also referred to as a snap-fit connection. Visible predetermined failure points such as, for example, tear seams of the trim element 4 and of the rear wall can also be avoided in the third embodiment.

LIST OF REFERENCE SIGNS

1 Impact cushion device
2 Impact cushion
3 Motor vehicle component
4 Trim element
5 Receptacle
6 Plastic foam
7 Latching connection
8 First latching element
9 Second latching element
10 Separation element
11 First sub-region
12 Second sub-region
13 Remainder of the trim element
14 Predetermined breaking point
15 Connection element
16 Tear seam
17 Structural component

The invention claimed is:

1. An impact cushion device for a motor vehicle, comprising:
   an impact cushion which is adjustable from a compressed stowage position to an expanded use position;
   a motor vehicle component and a cover trim element which conjointly delimit a receptacle for the impact cushion in the stowage position thereof, wherein
   the trim element, when disposing the impact cushion in the stowage position, is at least in regions held on the motor vehicle component by way of a latching connection so as to form the receptacle conjointly with the motor vehicle component, and the trim element, when adjusting the impact cushion from the stowage position thereof to the use position, is at least in regions releasable from the motor vehicle component; and a plastic foam disposed in the receptacle by which the impact cushion, in the stowage position thereof, is at least in regions obscured toward the trim element, the plastic foam being covered by the trim element.

2. An impact cushion device for a motor vehicle, comprising:

an impact cushion which is adjustable from a compressed stowage position to an expanded use position;

a motor vehicle component and a cover trim element which conjointly delimit a receptacle for the impact cushion in the stowage position thereof, wherein the trim element, when disposing the impact cushion in the stowage position, is at least in regions held on the motor vehicle component by way of a latching connection, and the trim element, when adjusting the impact cushion from the stowage position thereof to the use position, is at least in regions releasable from the motor vehicle component; and a plastic foam disposed in the receptacle by which the impact cushion, in the stowage position thereof, is at least in regions obscured toward the trim element, the plastic foam being covered by the trim element; and a separation element, by which a sub-region of the receptacle in which the plastic foam is disposed, conjointly with the trim element and/or the motor vehicle component, is completely enclosed in each position of the impact cushion.

3. The impact cushion device according to claim 2, wherein the separation element encloses the impact cushion in the stowage position thereof at least in regions.

4. The impact cushion device according to claim 2, wherein the separation element at one end is held on the trim element and at the other end on the motor vehicle component.

5. The impact cushion device according to claim 2, wherein the separation element at one end is stitched to the trim element.

6. The impact cushion device according to claim 2, wherein the trim element has a first latching element which is able to be brought to engage with a second latching element of the motor vehicle component for providing the latching connection.

7. The impact cushion device according to claim 6, wherein the separation element obscures the first latching element toward the second latching element.

8. The impact cushion device according to claim 7, wherein the trim element has a predetermined breaking point at which the first latching element is able to be separated from a remainder of the trim element when the impact cushion is adjusted from the stowage position to the use position.

9. The impact cushion device according to claim 8, wherein the trim element at the predetermined breaking point has a perforation.

10. The impact cushion device according to claim 8, wherein the trim element at the predetermined breaking point has a tear seam.

* * * * *